United States Patent [19]
Vigneron et al.

[11] Patent Number: 5,370,902
[45] Date of Patent: Dec. 6, 1994

[54] REGULATING METHOD FOR A METALLURGICAL TREATMENT CARRIED OUT ON A MOVING PRODUCT AND DEVICE FOR ITS IMPLEMENTATION

[75] Inventors: Guy Vigneron, Stuckange; Claude Fenot, Montginy Les Metz, both of France

[73] Assignee: Sollac, Puteaux, France

[21] Appl. No.: 905,688

[22] Filed: Jun. 29, 1992

[30] Foreign Application Priority Data

Jul. 1, 1991 [FR] France ............................ 91 08168

[51] Int. Cl.$^5$ ............................................. C23C 2/00
[52] U.S. Cl. ................................. 427/8; 427/9; 427/433
[58] Field of Search ............... 427/8, 433, 9; 73/150 R; 364/472, 469

[56] References Cited

U.S. PATENT DOCUMENTS

| | | |
|---|---|---|
| 3,557,351 | 1/1971 | Doering . |
| 4,135,006 | 1/1979 | Rendal ............................ 427/8 |
| 4,619,835 | 10/1986 | Francois ......................... 427/8 |
| 4,803,428 | 2/1989 | Crostack ......................... 427/8 |

FOREIGN PATENT DOCUMENTS

| | | |
|---|---|---|
| 0329157 | 8/1989 | European Pat. Off. . |
| 0390686 | 10/1990 | European Pat. Off. . |
| 3317708 | 12/1988 | Japan ............................... 427/8 |

OTHER PUBLICATIONS

D. M. Considine "Process Instruments and Controls Handbook" McGraw-Hill Co. 1974, pp. 8-54 to 8-57.
Patent Abstracts Of Japan, vol. 12, No. 275 (C-516)(3122), Jul. 29, 1988, & JP-A-63-053248, Mar. 7, 1988, M. Koyama, "Thickness Control Device for Surface Treatment".
Patent Abstracts Of Japan, vol. 5, No. 62, (C-52)(734), Apr. 25, 1981, & JP-A-56-013468, Feb. 9, 1981, K. Maehara, "Automatically Controlling Method for Hot Dipping Amount".
Patent Abstracts Of Japan, vol. 4, No. 174 (C-33)(656), Dec. 2, 1980, & JP-A-55-115960, M. Ono, et al., "Coating Weight Adjusting Method of Molten Metal Plating".

Primary Examiner—Shrive Beck
Assistant Examiner—Vi Duong Dang
Attorney, Agent, or Firm—Oblon, Spivak, McClelland, Maier & Neustadt

[57] ABSTRACT

The invention relates to a closed-loop regulating method for a metallurgical treatment carried out on a moving product (1), in which treatment the check measurement is obtained with a significant and variable delay in relation to the regulated treatment, in which method a digital regulator (14) having dynamic adjustment (RST sampled transfer-function) is used, characterized in that the sampling rate is continuously varied such that the abovementioned delay always remains equal to a predetermined integral number of sampling periods.

11 Claims, 4 Drawing Sheets

REGULATING METHOD FOR A METALLURGICAL TREATMENT CARRIED OUT ON A MOVING PRODUCT AND DEVICE FOR ITS IMPLEMENTATION

The present invention relates to metallurgical treatments performed on moving products such as strips or wires.

Currently, a physical or mathematical model of the treatment process is determined in a laboratory and precepts are defined for regulating the treatment in order to obtain a desired result. This therefore does not involve a truly closed-loop regulation.

Since metallurgical processes are complicated, the determination of the abovementioned model may require several years of study.

The regulation precepts have to be recalculated every time one of the parameters of the treatment varies, which necessitates each time lengthy studies when it is desired to carry out a regulating operation on a different machine.

Now, it is particularly beneficial in some cases, for example in the case of a treatment for zinc-coating a metal strip which travels in a bath of molten zinc, to obtain an accurate control of the process performed in order to reduce the manufacturing cost, in terms of material, and the amount of scrap. In particular, in the case of a galvanising zinc-coating treatment, it is important for accurate regulation to be obtained in order to reduce the quantity of zinc used.

Moreover, if it is desired to carry out a regulation, it often happens in metallurgical treatments that the check measurement is only made after a significant and variable delay in relation to the treatment carried out, the sensors not supporting the conditions prevailing in the region of the treatment. This makes it difficult to perform an accurate regulation and too high a consumption of material, for example of zinc in a galvanising treatment, results.

The present invention is provided for supplying a regulating method for such a metallurgical treatment which enables an accurate regulation to be performed whilst taking into account the significant delay between the instant of measurement and the instant of treatment.

The subject of the present invention is a closed-loop regulating method for a metallurgical treatment carried out on a moving product, in which treatment the check measurement is obtained with a significant and variable delay in relation to the regulated treatment, in which method a digital regulator having dynamic adjustment (RST sampled transfer-function) is used, characterised in that the sampling rate is continuously varied such that the abovementioned delay always remains equal to a predetermined integral number of sampling periods.

By virtue of this arrangement, it is possible to overcome the variations in delay between the instant when the check measurement is carried out and the instant when the treatment is performed.

Advantageously, the transfer function of the regulator is determined for a number of sampling operations (horizon) which is greater than or equal to the number of sampling periods corresponding to the abovementioned delay.

By virtue of this arrangement, the delay of the check measurement is taken into account completely.

According to another characteristic of the invention, the check measurement may be replaced by a result prediction supplied by a predictor from the value of the regulating parameter.

This enables closed-loop regulation to be obtained during the start-up of the treatment, when, because of the significant delay, it is not possible to obtain a measurement value. This is particularly important when there is a set-point change, a new treatment being started up with a set point different from that of the previous treatment.

Advantageously, the predictor operates in dynamic adjustment mode, its output signals being compared with the check-measurement signal.

This permits the algorithm of the predictor to be optimised.

According to a further characteristic of the invention, the regulator carries out a regulation using independent objectives by using at least one corrector introducing a correction taking into account the line speed of the product.

This enables an operation to be obtained in terms of regulating for and tracking the external phenomena such as the line speed of the product to be treated.

In the case where the treatment is performed by a stationary actuator disposed in the path of the product to be treated, a corrector is used which introduces a correction taking into account the position of the product in relation to the said actuator.

The fact of performing a procedure of tracking as a function of the position of the strip of product in relation to the actuator enables a more accurate regulation to be obtained and, consequently, in the case of a zinc-coating treatment for example, a significant saving in zinc used to be made.

If the metallurgical treatment is performed on the two faces of the strip, a regulator is provided for the treatment of each of the two faces.

According to a further characteristic of the invention, the regulator carries out a regulation using independent objectives which allows for different corrections in terms of amplitude and speed for coating setpoint changes (tracking) and for rejections of the perturbations of the coating for a constant coating setpoint (regulating).

The subject of the invention is also a device for the implementation of the method defined hereinabove, characterised in that the digital calculator is constituted by a microcomputer. Advantageously it is possible to use a personal computer of standard type.

Other characteristics and advantages of the invention will emerge from the description which follows of an exemplary embodiment of the invention, made by referring to the attached drawing in which.

Figure 1:
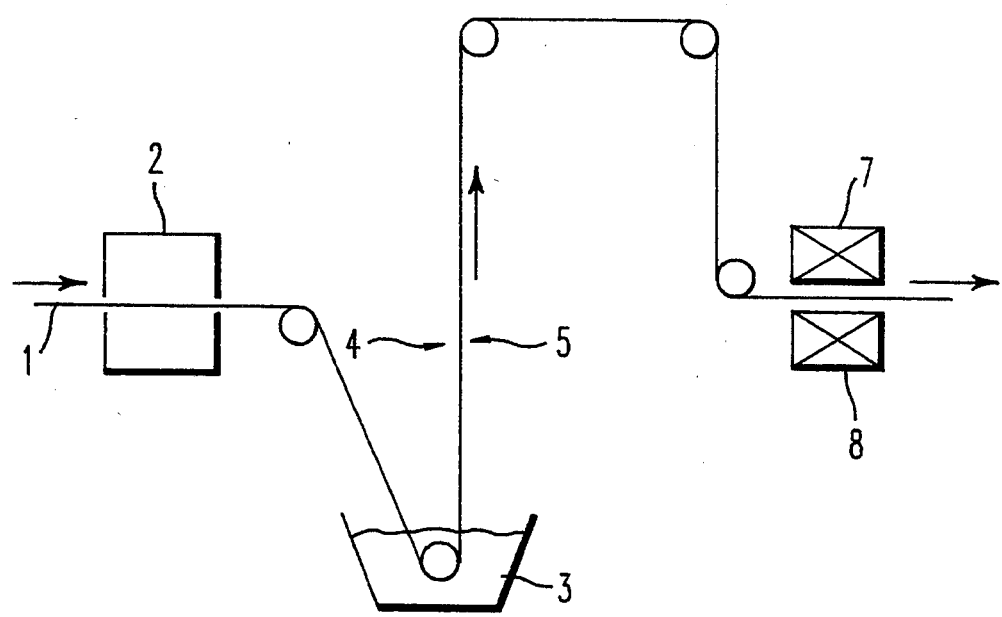
FIG. 1 shows diagrammatically a galvanising zinc-coating process.

FIG. 1 shows diagrammatically a galvanising installation intended for depositing a layer of zinc onto the two faces of a continuously moving steel strip. The strip 1 first of all passes through an oven 2, in which, in particular, an annealing operation is performed, and then it is taken into a bath of molten zinc 3 in which the two faces of the strip 1 are covered with a layer of molten zinc.

The strip then passes in front of two air jets 4 and 5 which "dry" the sheet-metal strip, that is to say they remove the surplus molten zinc 6 entrained by the strip 1.

After travelling approximately a hundred meters or so, during which the sheet-metal strip and the zinc which is deposited thereon cool down, the strip 1 arrives in front of measurement gauges 7 and 8 which are disposed so as to scan the width on either side of the path of the strip 1 and each of which measures the thickness of the zinc deposited.

Figure 2:
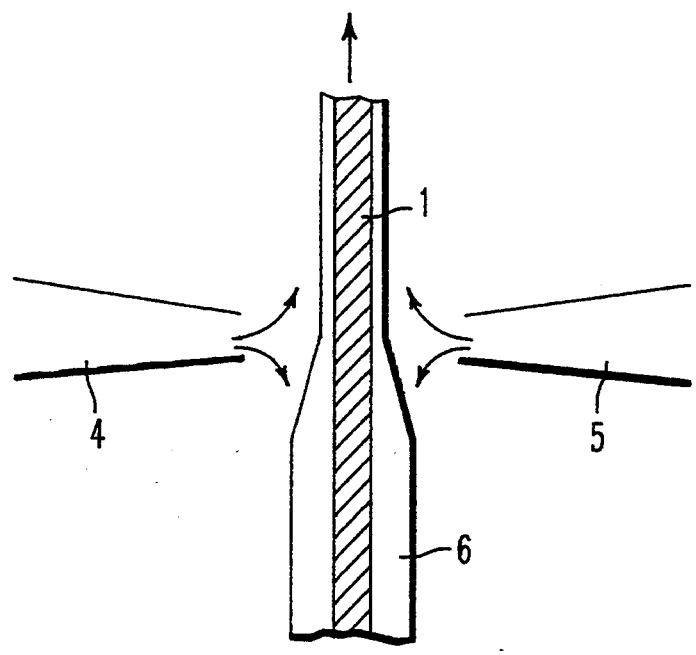
FIG. 2 is a detailed view showing the air jets constituting actuators.

FIG. 2 illustrates in detail the mode of action of the actuators constituted by the air jets 4 and 5, the flow of air pushing back towards the bath 3 a portion of the zinc 6 which has adhered to the sheet-metal strip 1. The regulating of the thickness of zinc 6 deposited on the sheet-metal strip 1 is therefore performed by the jets 4 and 5, the pressure and the outlet flow rate of the air of which is varied in order to obtain a greater or lesser reduction in the layer of zinc remaining after passing in front of the jets.

The measurement for checking the deposited thickness of zinc is performed by sensors 7 and 8 which are, because they are sensitive to temperature, disposed at a place where the strip 1 is sufficiently cold and, consequently, are far away in relation to the actuators constituted by the jets 4 and 5 by a path length of approximately a hundred meters. Taking into account the line speed of the sheet-metal strip 1, the delay between the instant when a location of the strip 1 is treated by the air jets 4 and 5 and the instant when it passes in front of the gauges 7 and 8, there is a delay of approximately two minutes.

Figure 3:
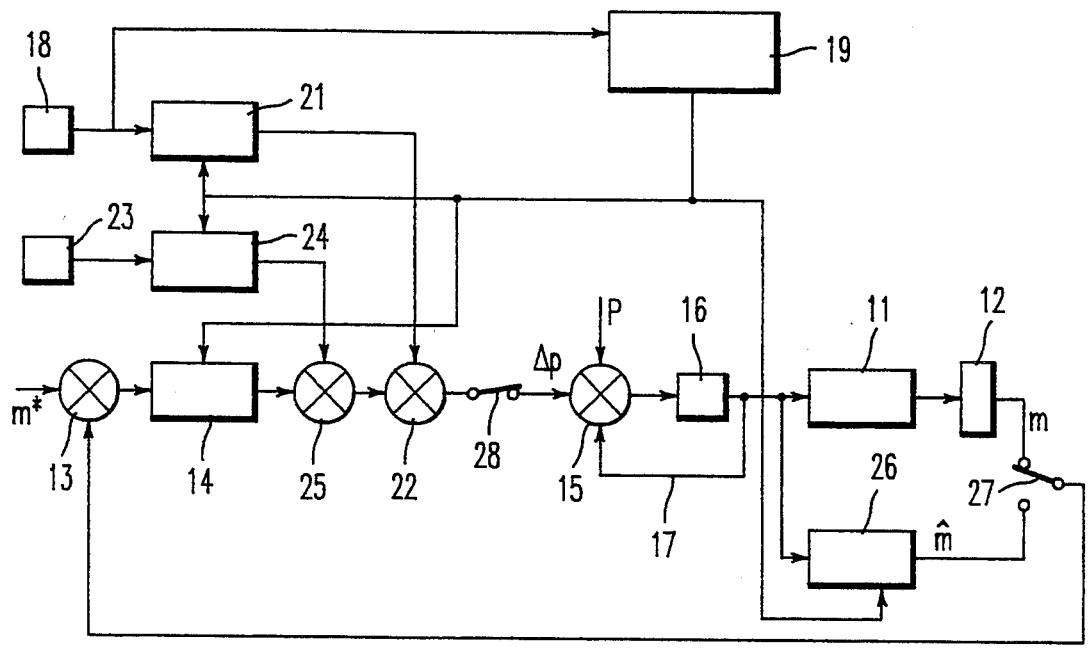
FIG. 3 is a schematic diagram of the regulation device.

FIG. 3 is a schematic diagram of the device for regulating the deposited thickness of zinc in the galvanising operations by acting on the outlet pressure of the air of the jets 4 and 5. The reference 11 designates the air-jet assembly constituting the actuators and their systems for feeding with variable-pressure compressed air. This unit receives at its input a pressure command which acts on the thickness of zinc remaining on the sheet-metal strip after it has passed in front of the jets. A measurement unit 12 comprising the gauges 7 and 8 supplies at its output the actual value of the thicknesses of zinc which are deposited on one of the faces of the strip.

The measurement unit 12 supplies, for example, a measurement, m, expressed in weight of zinc deposited per unit surface area, to an adder 13 which moreover receives a set-point value m*, which may vary as a function of the desired quality for the galvanised metal sheet. The output of the adder 13 is sent to a digital regulator 14 operating in dynamic adjustment mode, that is to say a digital regulator in which the transfer function is recalculated at every sampling instant. This digital regulator 14 supplies as output an error signal expressing a pressure, $\Delta P$, which is sent to an adder 15 which moreover receives a pressure set-point value P. The resulting signal is sent to a regulator 16, for example of the proportional and integral (PI) type, which comprises a feedback circuit 17 which transmits its output signal to the input adder circuit 15.

The pressure control signal supplied by the pressure regulator 15 to 17 is sent to the input of the actuator 11 described hereinabove.

As indicated hereinabove, the measurement m supplied by the control-measurement device 12 has a significant and variable delay in relation to the action carried out by the actuator 11.

The assembly of the active circuits 11 to 16 is controlled by a clock device for performing a dynamic adjustment procedure, that is to say for each sampling period determined by the central clock device, each of the abovementioned operators is actuated and the action is maintained during each sampling period.

In accordance with the invention, the sampling rate varies continuously in order to take into account variations in the line speed of the product, which speed is measured by a speed sensor 18 disposed, for example, on a roller entraining the sheet-metal strip 1. This variation in the sampling rate is controlled in such a manner that the time delay between the action carried out by the actuator 11 and the measurement performed by the control device 12 remains constantly equal to a predetermined integral number of sampling periods.

This is illustrated in FIG. 3 by the fact that the clock 19 for controlling the sampling operations receives at its input the output signal of the speed sensor 18 and controls the various logical operators.

The digital regulator 14 calculates for each sampling period a pressure-correction factor which is a sum weighted by coefficients r, s and t which, because of the dynamic adjustment, are redefined for each sampling period. This weighted sum is calculated taking into account a certain number of previous sampling periods; the horizon, that is to say the number of previous sampling periods taken into account, is at least equal to the number of sampling periods which corresponds to the delay of the control measurement in relation to the treatment. The pressure correction A P(t) for the sampling period at an instant t is given by the following formula:

$$\Delta P(t) = \sum_{i=0}^{Tn} t_i m^*(t-i) + \sum_{i=1}^{Tn} s_i \Delta P(t-i) + \sum_{i=0}^{Tn} r_i m(t-i)$$

in which $r_i$, $s_i$ and $t_i$ are the values of the parameters of the regulator for the $i^{th}$ sampling period preceding the sampling period during which the calculation is carried out, Tn is the control horizon, m(t-i) is the measured mass of the coating and m* (t-i) is the set-point value of the coating for this preceding $i^{th}$ sampling period.

In accordance with the invention, a tracking and regulating method using independent objectives is performed and corrective factors are introduced into the determination of the pressure correction taking into account external events such as the speed of the sheet-metal strip and its position in relation to the actuators constituted by the air jets.

For this purpose, the speed-measurement signal supplied by the sensor 18 is sent to a corrector 21, which is controlled by the clock signals supplied by the clock 19, and which produces a speed-correction signal which is sent to an adder 22 which moreover receives the pressure-correction signal supplied by the regulator 14.

In a similar manner, a strip-position sensor 23, for example of the capacitive type, supplies a signal which is sent to a corrector 24, which also receives the clock signals from the clock 19 and which supplies a position-correction signal which is sent to another adder circuit 25 connected to the output of the regulator 14.

The parameters of the correctors 21 and 24 are determined by recursive identification on the basis of data supplied by the installation during testing where only the corresponding parameter is varied, namely the speed or the position of the strip. These parameters remain constant during the regulating procedure.

These correctors compensate for the position and speed perturbations of the strip between the jets before they are detected by the gauge 12 for measuring the coating by performing an action of the "feed-forward" type.

According to another characteristic of the invention, the signal m supplied by the control-measurement device 12 may be replaced during the regulating procedure, by a signal m supplied by a predictor 26 which receives the control signal supplied to the actuator 11 and produces a prediction of the deposited mass. This predictor 26 is of digital type and also comprises a dynamic-adjustment device, that is to say its parameters defining the prediction algorithm are defined for each sampling period. This predictor 26 also receives a clock pulse originating from the clock 19. The parameters of the predictor 26 are determined by recursive identification based on data supplied by the installation where only the corresponding parameter, namely the pressure, is varied.

A two-position switch 27 enables either the measurement signal m or the prediction signal m to be sent to the adder circuit 13.

The regulating circuit also comprises a switching device 28 disposed between the output of the adder circuit 22 and the input of the adder circuit 15, that is to say the input of the circuit regulating the pressure set-point. This switching device allows for operation "with or without" regulation of the coating.

While operating without regulation, the switching device 28 is open and the operator manually modifies his coating weight by acting on the pressure set-point entering the adder 15.

When the switching device 28 is closed, the regulation maintains the coating weight constant by automatically correcting the pressure displayed by the operator.

Figure 4:
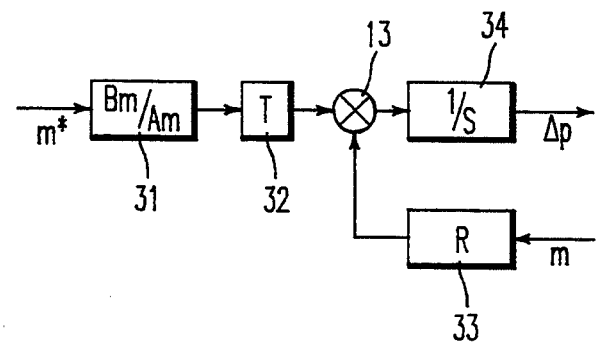
FIG. 4 is a detailed view of the regulator of FIG. 3.

FIG. 4 is the schematic diagram of a detail showing the regulator 14.

In this figure, the various operators constituting the digital regulator 14 having dynamic adjustment are shown. Each of these operators carries out a calculation using parameters R,S,T,Bm and Am of the transfer function which are redefined for each sampling period. The set of operators shown performs the transfer function of the regulator.

A first operator 31 receives the set-point value m* and dictates the speed and the amplitude of variation of this set-point. The output signal is sent to a second operator 32 which compensates for the delay of the measurement m and whose output signal is sent to the adder 13. The operators 31 and 32 fix the tracking 20 characteristics of the regulator.

The mass-measurement signal m supplied by the control system 12 is sent to the input of an operator 33 which dictates the speed and the amplitude of the pressure correction and whose output is also sent to the input of the adder 13, the output of which is sent to a fourth operator 34 which cancels out the error between the set point m* and the measurement m and supplies as output the pressure-correction signal $\Delta P$.

The operators 33 and 34 fix the regulating characteristics of the coating regulator.

Figure 5:
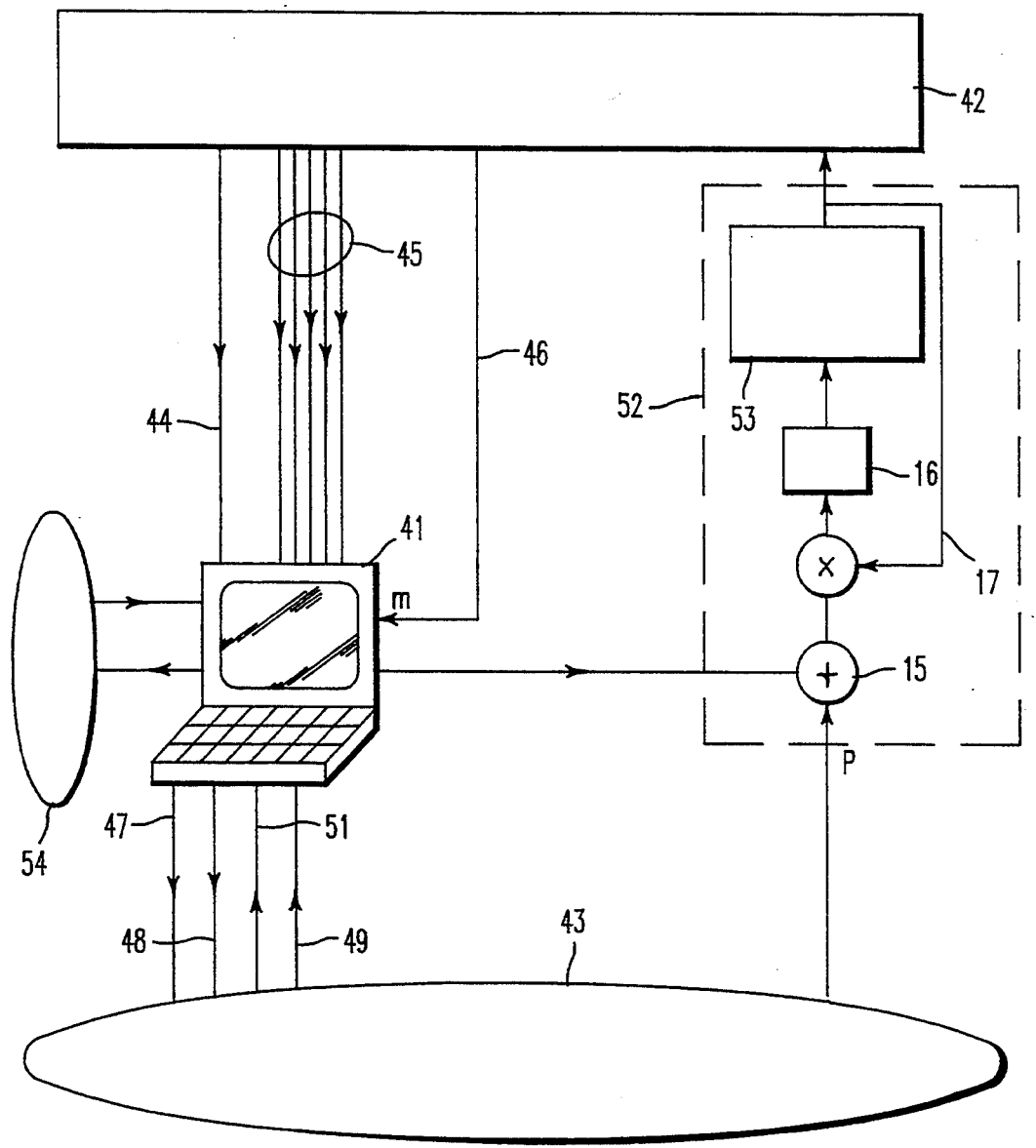
FIG. 5 illustrates one embodiment of the invention.

FIG. 5 illustrates an exemplary embodiment of the invention. It is based on the use of a microcomputer of standard type and of a package for the identification of the dynamic process models.

In this figure are seen a console 41 comprising a display screen and a keyboard which is connected to the treatment installation diagrammised at 42 and a microcomputer diagrammised at 43. The treatment installation 42 supplies to the console 41 information originating from the sensors, namely an item of speed information (line 44), information concerning the position of the metal sheet (lines 45) and an item of information concerning the check measurement (line 46).

The computer system receives from the console 41 information concerning the position and the profile of the metal sheet (line 47) and the check measurement (line 48) and send back to the console the set-point value, m* of the coating mass (line 49) and an item of information concerning the position of the jets (line 51). The pressure-difference set-point signal calculated at each sampling period is sent to the pressure-regulating device 52 in which the elements 15 to 17 described in reference to FIG. 3 are encountered again. The reference 53 designates a compressor which supplies as output to the installation 42 the pressure intended for one of the jets.

In the example described, the treatment is carried out on the two faces of the metal sheet and a second regulating device is therefore provided for the second face. This second device is shown diagrammatically at 54.

This regulating device has been installed on a galvanising line in which the sheet-metal strip moves at a speed which can vary widely namely from 30 to 180 meters per minute. The horizon has been fixed to eight sampling periods, the delay being maintained at seven sampling periods. The sampling period then varies from 35.5 to 6.76 seconds.

The operation of the device which has just been described is the following. On starting an installation, the parameters of all the elements described in FIG. 2 are determined by recursive identification methods under the control of the package for the identification of the dynamic process models. The algorithms are themselves determined by another package. The parameters of the two correctors 21 and 24 are determined once and for all.

When the treatment installation is started, the regulating is carried out by using the data supplied by the predictor 26 and the switch 27 is therefore in its down position. As soon as the measurement device 12 is able to supply measurements, the switch 27 may be rocked into the position shown in FIG. 3. The use of the predictor 26 also enables possible failures of the measurement device 12 to be alleviated, the regulation continuing by using the prediction values m̂.

Figure 6:
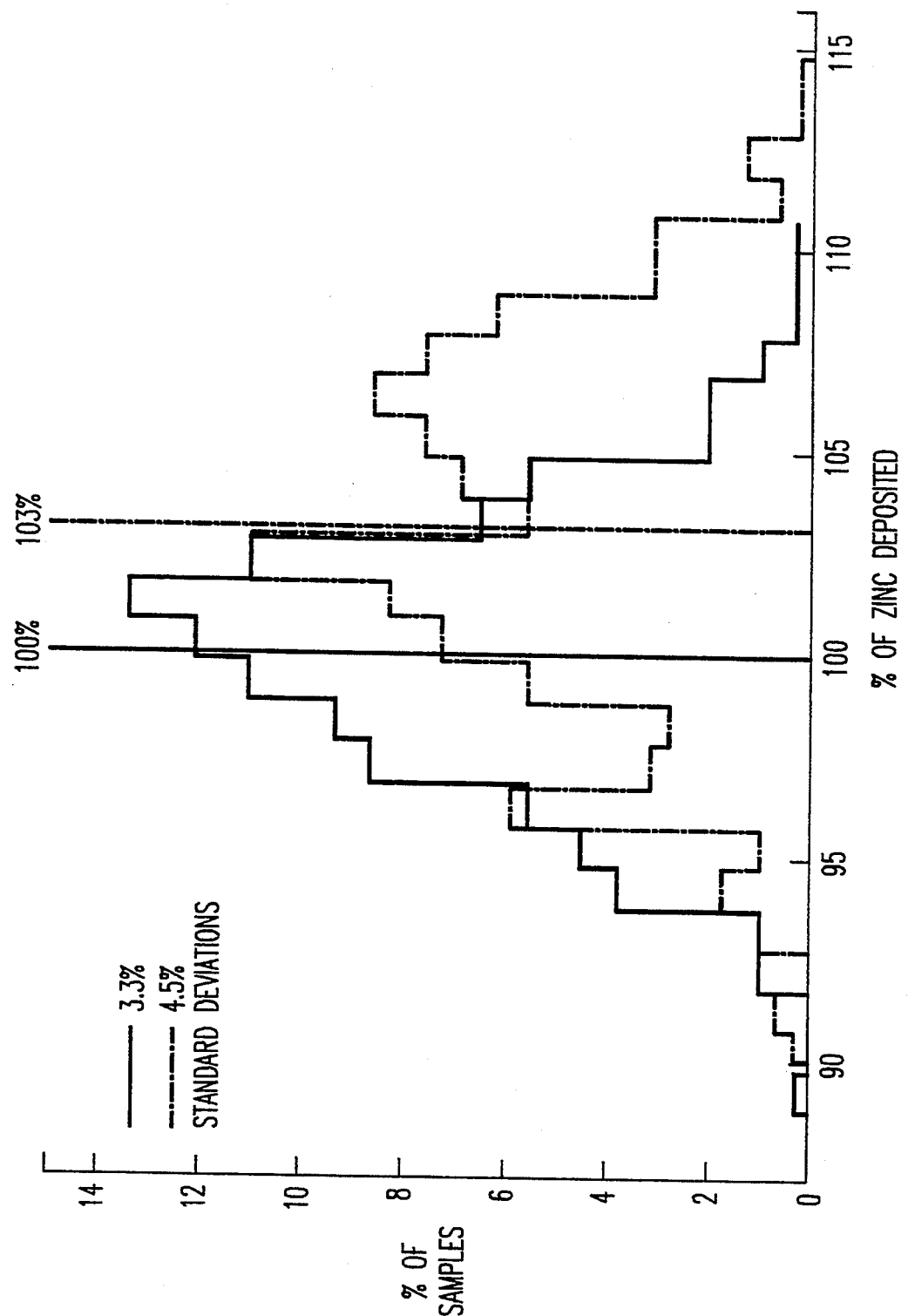
FIG. 6 is a comparative diagram.

FIG. 6 is a comparative diagram showing the results obtained on one face without regulation broken-line curve) and on the other face for which the method according to the invention has been implemented (solid-line curve). A 25% improvement in the standard deviation is observed and the average coating weight is centred on the set point (100%).

It is seen that the invention enables an accurate regulation of a thermal treatment to be performed in which the check measurement is carried out after a significant delay, such as galvanising, which enables in particular a significant saving to be made in terms of the material used, zinc in this case.

By virtue of the regulation using independent objectives which is carried out by the digital regulator 14, the tracking and regulation are defined for set-point changes in the coating mass and the return of the measurement sensor taking into account the delay in the measurement m. The correctors 21 and 24 enable the overall performance of the regulation to be improved by applying an immediate correction of the signal ΔP. This is obtained for very large variations in the line speed which, as indicated hereinabove, may vary over ratios ranging from 1 to 6.

Moreover, because the predictor enables a correct regulation to be obtained, even in the absence of check-measurement signals, the efficiency of the galvanising installation is further improved. Finally, the use of specialised hardware and software enables a regulation installation to be defined very rapidly, of the order of several weeks, whereas, by conventional methods for determining a physical or mathematical model, the perfecting of a regulating system could require several years.

Another advantage of the invention results in the fact that, by virtue of the predictor, when parameters of the installation are changed, in particular the set-point value, a correct regulation may be obtained as soon as the procedure is started, which reduces the loss in zinc.

We claim:

1. Closed-loop regulating method for a metallurgical coating treatment carried out on a moving product (1), in which coating treatment a check measurement is obtained with a delay in relation to a regulated treatment, in which method a digital regulator (14) having dynamic adjustment is used, characterized in that a sampling rate is continuously varied such that the abovementioned delay always remains equal to an integral number of sampling periods.

2. Regulating method according to claim 1, characterised in that the transfer function of the regulator (14) is determined for a number (Tn) of sampling operations (horizon) which is greater than or equal to the number of sampling periods corresponding to the above-mentioned delay.

3. Regulating method according to claim 1 characterised in that the check measurement is replaced by a result prediction supplied by a predictor (26) from the value of a regulating parameter (P).

4. Regulating method according to claim 3, characterised in that the predictor operates in dynamic adjustment mode, its output signals ($\hat{m}$) being compared with a check-measurement signal (m).

5. Regulating method according to claim 3, characterised in that an algorithm of the predictor (26) is obtained by recursive identification.

6. Regulating method according to claim 1, wherein said moving product moves at a line speed, and wherein the regulator (14) carries out a regulation using independent objectives and uses at least one corrector (21) introducing a correction taking into account the line speed of the product.

7. Regulating method according to claim 6, characterised in that the sampling rate varies as a function of the line speed of the product (1) to be treated.

8. Regulating method according to claim 6, in which the treatment is performed by a stationary actuator (4, 5; 11) disposed in the path of the product to be treated, characterised in that a corrector (24) is used which introduces a correction taking into account the position of the product in relation to the said actuator.

9. Regulating method according to claim 6 or 8, characterised in that the algorithms of each of the correctors (21, 24) are determined by a recursive-identification method.

10. Regulating method according to claim 7, applied to the regulating of a treatment on the two faces of a product (1) in the form of a strip, characterised in that a regulator is provided for the treatment of each of the two faces.

11. Regulating method according to claim 1, wherein said digital regulator (14) controls coating thickness.

* * * * *

UNITED STATES PATENT AND TRADEMARK OFFICE
CERTIFICATE OF CORRECTION

PATENT NO.   : 5,370,902
DATED        : December 6, 1994
INVENTOR(S)  : Guy VIGNERON, et al.

It is certified that error appears in the above-indentified patent and that said Letters Patent is hereby corrected as shown below:

On the title page, Item [75], the second inventor's city is spelled incorrectly. It should read:

--Montigny Les Metz--

Signed and Sealed this

Seventh Day of March, 1995

Attest:

BRUCE LEHMAN

*Attesting Officer*    *Commissioner of Patents and Trademarks*